United States Patent
Swanson et al.

(10) Patent No.: US 9,880,859 B2
(45) Date of Patent: Jan. 30, 2018

(54) BOOT IMAGE DISCOVERY AND DELIVERY

(71) Applicant: Intel Corporation, Santa Clara, CA (US)

(72) Inventors: Robert C. Swanson, Olympia, WA (US); Mallik Bulusu, Olympia, WA (US); Vincent J. Zimmer, Federal Way, WA (US); Robert W. Cone, Portland, OR (US); Robert B. Bahnsen, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 14/226,223

(22) Filed: Mar. 26, 2014

(65) Prior Publication Data
US 2015/0277937 A1    Oct. 1, 2015

(51) Int. Cl.
*G06F 9/24* (2006.01)
*G06F 9/44* (2006.01)

(52) U.S. Cl.
CPC .................. *G06F 9/4416* (2013.01)

(58) Field of Classification Search
CPC ..................................... G06F 9/4401
See application file for complete search history.

(56) References Cited

U.S. PATENT DOCUMENTS

| | | | |
|---|---|---|---|
| 7,971,045 B1* | 6/2011 | Currid | G06F 9/4416 709/226 |
| 8,151,101 B2 | 4/2012 | Challener et al. | |
| 8,260,891 B2* | 9/2012 | Abels | H04L 63/20 709/208 |
| 2005/0198629 A1* | 9/2005 | Vishwanath | G06F 8/61 717/174 |
| 2006/0020837 A1* | 1/2006 | Rothman | G06F 9/4416 713/310 |
| 2006/0026429 A1* | 2/2006 | Kudo | G06F 21/575 713/173 |
| 2010/0115256 A1* | 5/2010 | Challener | G06F 8/66 713/2 |

FOREIGN PATENT DOCUMENTS

| | | |
|---|---|---|
| CN | 1802636 A | 7/2006 |
| CN | 101925876 A | 12/2010 |
| CN | 102498723 A | 6/2012 |

OTHER PUBLICATIONS

Intel Corporation, "The Pentium II Xeon Processor Server Platform System Management Guide," Jun. 1998, 32 pages.

(Continued)

*Primary Examiner* — Kim Huynh
*Assistant Examiner* — Eric Chang
(74) *Attorney, Agent, or Firm* — Barnes & Thornburg LLP

(57) ABSTRACT

Technologies for managing image discovery includes a server controller to cause a server to enter a pre-boot state. The server controller communicates with the server while the server maintains the pre-boot state to determine identification data of the server in response to a transitioning the server to the pre-boot state. The server controller identifies a boot image of the server based on the identification data of the server and associates the server with the identified boot image.

27 Claims, 5 Drawing Sheets

(56) References Cited

OTHER PUBLICATIONS

Intel Corporation, "Enhanced Serial Peripheral Interface (eSPI), Interface Base Specification (for Client and Server Platforms)," Jun. 2013, 133 pages.

Wikipedia, "Platform Environment Control Interface," available at http://en.wikipedia.org/wiki/Platform_environment_control_interface, printed May 2, 2014, 2 pages.

Wikipedia, "Explicitly parallel instruction computing," available at http://en.wikipedia.org/wiki/Explicitly_parallel_instruction_computing, printed May 2, 2014, 3 pages.

* cited by examiner

BOOT IMAGE DISCOVERY AND DELIVERY

BACKGROUND

Engineers continually endeavor to improve the performance and efficiency of platforms and computing systems while minimizing the associated manufacturing and operating costs. For example, unnecessary or superfluous hardware components may be removed and power consumption may be formally managed (e.g., through hardware, firmware, and/or software). Additionally, distributed computing (e.g., cloud computing) and computation aggregation mechanisms have sought to improve performance and efficiency. Rack scale architecture (RSA) permits many servers or other computing devices to be connected to a switch (e.g., a management device) and shared resources to be distributed. For example, shared resources may be shared among nodes (i.e., devices connected to the switch) with a bulk of the capabilities being embedded in or otherwise handled by the switch.

A switch may manage the booting of several servers in its "rack." In doing so, the switch may instruct the servers when to boot, perform updates, idle, turn off, and/or perform other functionality. Additionally, a switch or other remote device may boot an operating system of one of the servers remotely, which is feasible due to the hardware-agnostic nature of operating systems. However, Basic Input/Output System (BIOS) and other pre-boot firmware must be fully aware of the server hardware in order to initialize that hardware. As such, BIOS and pre-boot firmware are stored on locally attached flash memory of the server, which include boot instructions customized to the particular node (e.g., based on the central processing unit, chipset, component manufacturer, and/or date of component production).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
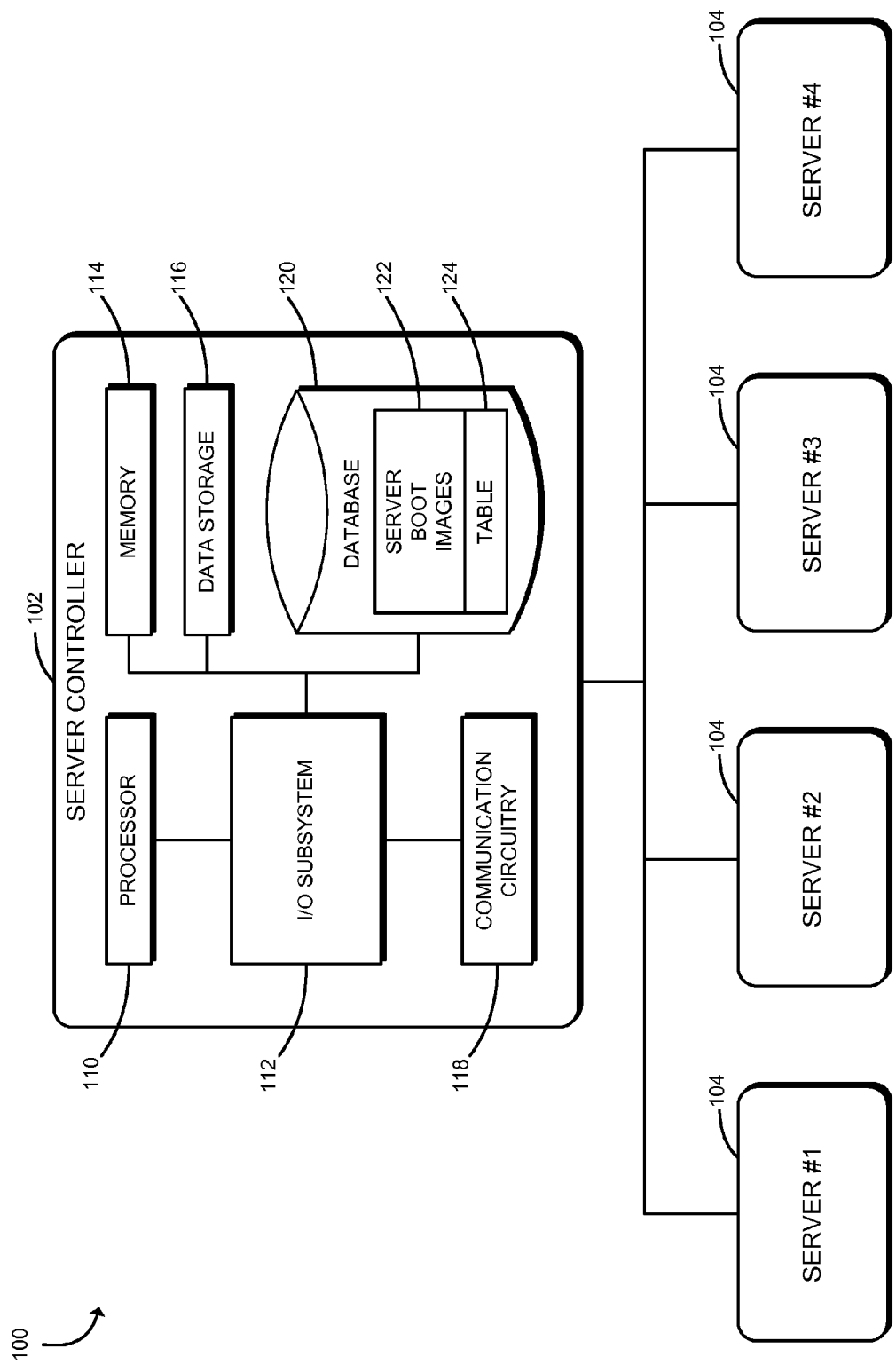
FIG. 1 is a simplified block diagram of at least one embodiment of a system for boot image discovery and delivery.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for boot image discovery and delivery includes a server controller 102 and one or more servers 104. Although only one server controller 102 is shown in FIG. 1, it should be appreciated that the system 100 may include multiple server controllers 102 in other embodiments. Similarly, although the illustrative embodiment of FIG. 1 shows four servers 104, the system 100 may include a different number of servers 104 in other embodiments. Further, in some embodiments, the server controller 102 may be physically remote of the servers 104.

In use, as described in more detail below, the server controller 102 is configured to manage image discovery and delivery of the boot images to the servers 104. In the illustrative embodiment, the server controller 102 is configured to cause the server 104 to enter a pre-boot state in which the server BIOS and/or other firmware are not fetched. For example, in some embodiments, the server controller 102 may cause the server 104 to be partially powered (e.g., by powering the server 104 from an off state to a low-power state in which the server 104 does not attempt to fetch the server BIOS). While the server 104 is in the pre-boot state, the server controller 102 communicates with the server 104 to determine identification data of the server 104 (e.g., identifying the server 104 and/or one or more hardware components of the server 104). The server controller 102 identifies a boot image for the server 104 based on the identification data and associates the server 104 with the identified boot image stored in memory of the server controller 102. In this way, the correct system BIOS and/or other firmware images required for system operation may be delivered to the server 104 on demand without requiring a truly persistent medium, such as flash memory, for image storage on the server 104. For example, a Serial Peripheral Interface (SPI) flash memory of the server 104, which is typically located on the server 104, may be emulated in memory of the server controller 102. Accordingly, some or all of the flash memory locally attached to the server 104 and ordinarily reserved for the system BIOS may be removed or otherwise utilized. Additionally, the server controller 102 is also able to deliver the appropriate boot images to servers 104 having different hardware architectures (e.g., in a heterogeneous computing environment). It should further be appreciated that the techniques described herein reduce the node attack surface (i.e., reducing security threats), allow multiple heterogeneous systems to participate within a given RSA domain, and reduce the domain's overall bill of materials (BOM) cost.

In some embodiments, a processor 210 (see FIG. 2) of the server 104 or the server 104 itself may be powered to a standby state, low-power state, or other pre-boot state in order to enable the server controller 102 to ascertain its "signature" or other identification data. In yet another embodiment, the processors of the server 104 may access a waking vector that stores common code, but does not access specific hardware of the server 104, to provide the server controller 102 with information regarding the required boot images 122. For example, the server controller 102 can launch just the server's 104 initial BIOS boot block, which indicates to the server controller 102 the next image 122 it should provide in memory.

The server controller 102 may be embodied as any type of computing device capable of boot image discovery and delivery and performing the functions described herein. In the illustrative embodiment, the server controller 102 is embodied as a top of rack (TOR) switch. However, in other embodiments, the server controller 102 may be embodied as a server, microcontroller, desktop computer, laptop computer, tablet computer, notebook, netbook, Ultrabook™, cellular phone, smartphone, wearable computing device, personal digital assistant, mobile Internet device, Hybrid device, and/or any other suitable computing/communication device. As shown in FIG. 1, the illustrative server controller 102 includes a processor 110, an input/output ("I/O") subsystem 112, a memory 114, a data storage 116, a communication circuitry 118, and a database 120. Of course, the server controller 102 may include other or additional components, such as those commonly found in a typical server or other computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the server controller 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the server controller 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the server controller 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the server controller 102 such as, for example, databases, boot images, server identification data, hardware identification data, and/or other data useful in the operation of the server controller 102.

The communication circuitry 118 may be embodied as any communication circuit, device, or collection thereof, capable of enabling communications between the server controller 102 and other remote devices (e.g., over a network). As discussed above, the server controller 102 may communicate with the servers 104 to facilitate, for example, boot image discovery and delivery. The communication circuitry 118 may be configured to use any one or more communication technologies (e.g., wireless or wired communications) and associated protocols (e.g., Ethernet, Bluetooth®, Wi-Fi®, WiMAX, etc.) to effect such communication.

As shown in FIG. 1, the server controller 102 may also include a database 120. The illustrative database 120 may be embodied as any combination of hardware, firmware, and/or software suitable for performing the functions described herein. For example, in some embodiments, the database 120 may be embodied as a data structure stored on the server controller 102 suitable for storing server boot images 122, a mapping table 124, pointers, links, data associations, and/or other data. Further, depending on the particular embodiment, the database 120 may be embodied as a single database or as multiple databases and may be stored on the server controller 102 and/or distributed across one or more remote computing devices accessible by the server controller 102. As discussed below, the server boot images 122 (e.g., BIOS and/or other pre-boot firmware) may be accessed by the servers 104 to boot the servers 104. In some embodiments, the server boot images 122 may be stored in partitions of the database 120 (e.g., in the memory 114 or the data storage 116). It should be appreciated that, depending on the particular embodiment, the server boot images 122 may include boot images for the server 104 and/or one or more components of the server 104. Additionally, in some embodiments, a mapping table 124 may be stored in the database 120 and may include one or more entries for each of the servers 104 related to the server boot image 122 associated with the corresponding server 104. For example, the entry may be mapped to (i.e., point to) a server boot image 122 corresponding with the server 104 such that the server 104 may automatically access the appropriate server boot image 122. As indicated above, in some embodiments, the database 120 may be stored on, or otherwise form a portion of, the memory 114 or the data storage 116 of the server controller 102.

In the illustrative embodiment, the servers 104 are embodied as servers on the same server "rack" as the server controller 102. However, in other embodiments, the servers 104 may be otherwise arranged. Each of the servers 104 may be embodied as any type of computing device capable of performing the functions described herein. In some embodiments, each of the servers 104 may be similar to the server controller 102 as described above. For example, each of the servers 104 may be embodied as a server, desktop computer, laptop computer, tablet computer, notebook, netbook, Ultrabook™, cellular phone, smartphone, wearable computing device, personal digital assistant, mobile Internet device, Hybrid device, and/or any other suitable computing/communication device.

Figure 2:
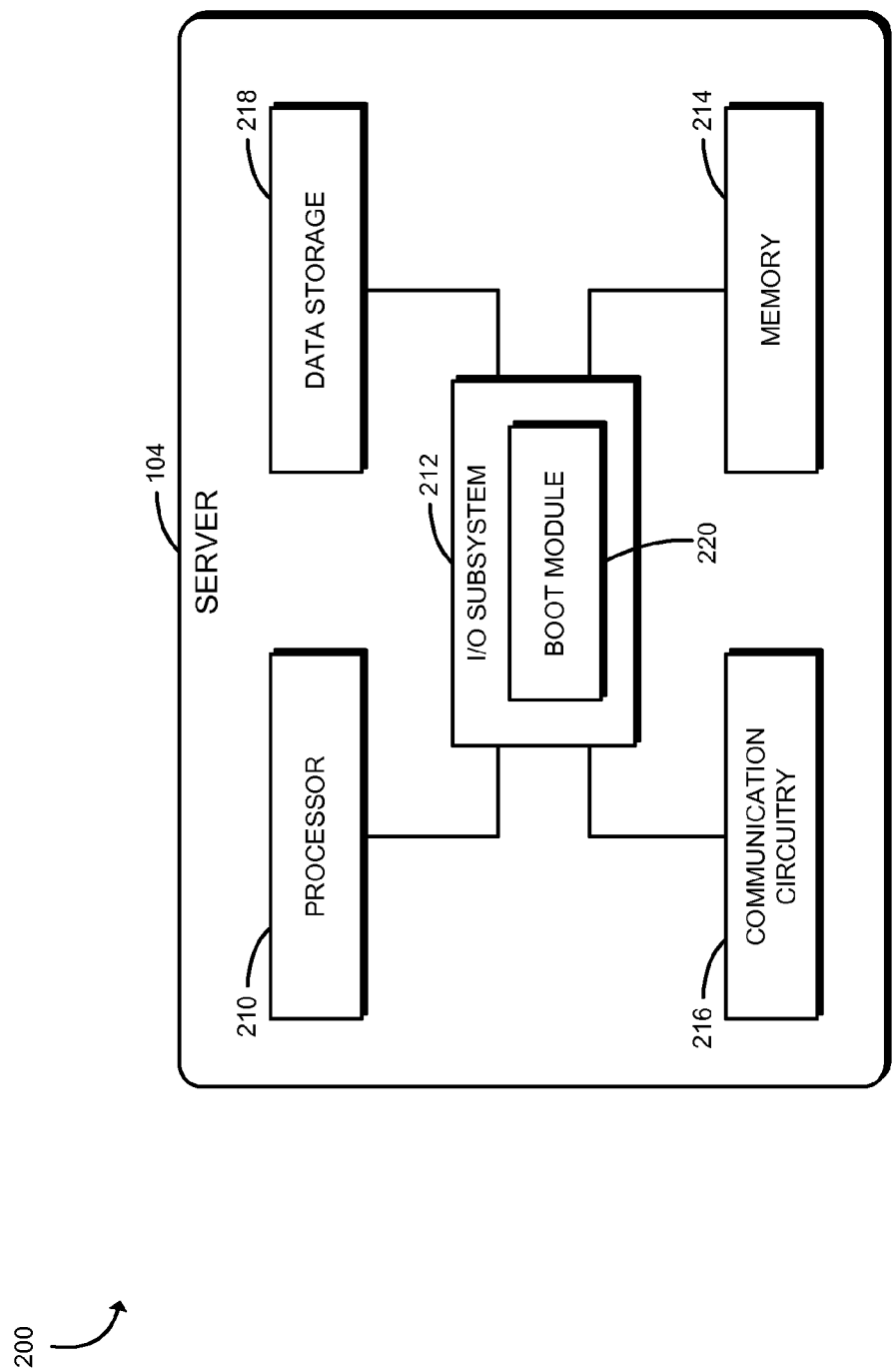
FIG. 2 is a simplified block diagram of at least one embodiment of a server of the system of FIG. 1.

Further, as shown in FIG. 2, each illustrative server 104 includes a processor 210, an I/O subsystem 212, a memory 214, a communication circuitry 216, and a data storage 218. The components of the servers 104 are similar to the corresponding components of the server controller 102, the description of which is equally applicable to the corresponding components of the servers 104 and is not repeated herein for clarity of the description. Further, it should be appreciated that the servers 104 may include other components, sub-components, and/or devices commonly found in a computing device or server. For example, as shown in the illustrative embodiment of FIG. 2, the I/O subsystem 212 includes a boot module 220.

The boot module 220 may be embodied as any combination of hardware, firmware, and/or software capable of permitting communication between the server 104 and the server controller 102 while the server 104 is in a pre-boot state (e.g., a partially powered state, low-power state, or standby power state) and prior to retrieving and/or loading the BIOS image of the server 104. For example, in some embodiments, the server 104 is unable to boot while in the pre-boot state. In some embodiments, the boot module 220 acts as an interface between the server 104 and the server controller 102. For example, the boot module 220 may permit the server 104 to communicate with the server controller 102 over a Platform Environment Control Interface (PECI), a Processor Information Read Only Memory (PIROM), an Enhanced Serial Peripheral Interface (eSPI), an Inter-Integrated Circuit (I2C), and/or another interface. Of course, the boot module 220 may facilitate communication with the server controller 102 prior to loading firmware images on the server 104 using another suitable interface in other embodiments. Although the boot module 220 is illustratively shown as part of the I/O subsystem 212, in other embodiments, the boot module 220 may be independent of the I/O subsystem 212 or form a portion of another component of the server 104 (e.g., the processor 210 or the communication circuitry 216). In an embodiment, the server 104 routes both an eSPI and PECI interface to the server controller 102 (e.g., the PECI interface being tunneled through the eSPI interface) such that memory accesses to a traditional flash memory (e.g., via SPI) are instead directed to memory of the server controller 102. Additionally, in some embodiments, one or more components of the server controller 102 (e.g., the I/O subsystem 112, the processor 110, or the communication circuitry 118) includes a corresponding interface to permit the communication with the boot module 220 of the server 104. As discussed above, in other embodiments, the server 104 may boot to a common state, which does not execute hardware that is not common, and the server 104 may communicate with the server controller 102 through an I/O interface to self-describe requirements such that the server controller 102 can provide the correct images 122.

Figure 3:
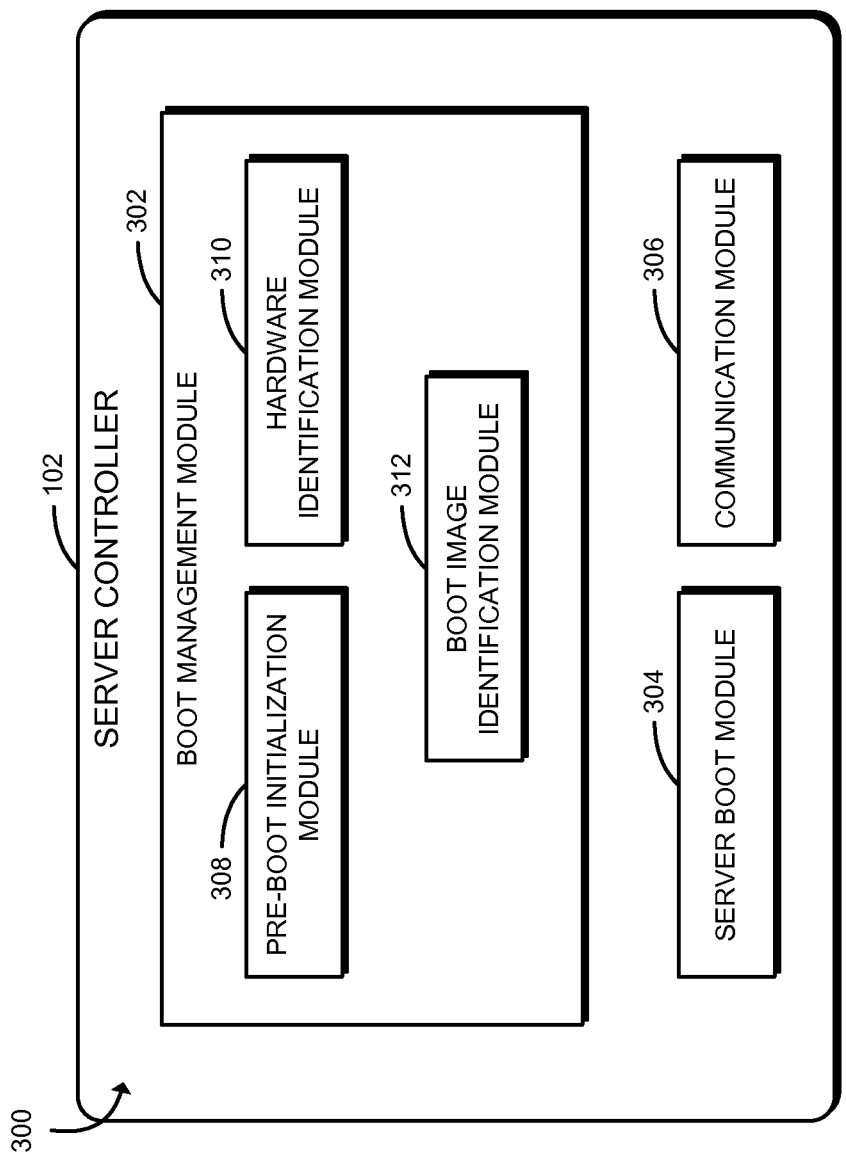
FIG. 3 is a simplified block diagram of at least one embodiment of an environment of a server controller of the system of FIG. 1.

Referring now to FIG. 3, in use, the illustrative server controller 102 establishes an environment 300 for boot image discovery and delivery. As discussed below, the server controller 102 determines identification data (e.g., an identity) of the server 104 and associates the server 104 with the appropriate boot image(s) based on the identification data (e.g., BIOS, manageability engine (ME) firmware, co-processor firmware, and/or other firmware). In doing so, the server controller 102 is able to effectively emulate SPI flash traditionally used for booting servers (e.g., via an eSPI interface). The illustrate environment 300 of the server controller 102 includes a boot management module 302, a server boot module 304, and a communication module 306. Additionally, the boot management module 302 includes a pre-boot initialization module 308, a hardware identification module 310, and a boot image identification module 312. Each of the modules of the environment 300 may be embodied as hardware, software, firmware, or a combination thereof. Additionally, in some embodiments, one or more of the illustrative modules may form a portion of another module (e.g., the server boot module 304 may form a portion of the boot management module 302).

The boot management module 302 handles the automatic discovery of boot images and delivery of those images to the appropriate server 104. It should be appreciated that the boot management module 302 may use any suitable techniques or mechanisms for doing so. For example, the boot management module 302 may utilize PECI, PIROM, eSPI, and/or other suitable technologies. Of course, in some embodiments, the boot management module 302 may utilize technologies analogous to those described herein. As indicated above, the boot management module 302 includes the pre-boot initialization module 308, the hardware identification module 310, and the boot image identification module 312.

The pre-boot initialization module 308 causes a server 104 (i.e., the server 104 identified to boot) to enter a pre-boot state (e.g., a partially powered, low-power state). As indicated above, the server 104 is powered without causing, or otherwise requiring, the server 104 to fetch or attempt to fetch the system BIOS or other firmware that is typically accessed in response to a power-on sequence. For example, the pre-boot initialization module 308 may communicate with the server 104 (e.g., via the communication module 306) to instruct the server 104 to power itself to such a state. In some embodiments, it should be appreciated that the pre-boot state of the server 104 may be a low-power state that consumes less power than a full-power (i.e., fully operational) state of the server 104. Further, in some embodiments, standby power of the server 104 is utilized to facilitate partially powering the server 104 to the pre-boot state. In other embodiments, PIROM accessible via PECI may be utilized to power the server 104. In yet other embodiments, the server 104 may be fully powered, provided that the server 104 is not instructed to fetch the system BIOS or other boot firmware as described above.

The hardware identification module 310 communicates with the server 104 while the server 104 is in the pre-boot state to determine identification data of the server 104. In the illustrative embodiment, the hardware identification module 310 determines one or more hardware components (e.g., controllers, processors, integrated circuits, or other silicon-based components) of the server 104. In doing so, the hardware identification module 310 may utilize any suitable mechanisms or techniques. For example, the hardware identification module may communicate with the server 104 to determine a central processing unit identification (CPUID) of the server 104. It should be appreciated that a CPUID may be utilized to determine a processor type and/or features of the server 104. The hardware identification module 310 may determine the identity of the server 104 and/or components of the server 104 (e.g., model, type, components, features, etc.) based on the identification data. Of course, the hardware identification module 310 may determine the identity of the server 104 and/or components using other suitable mechanisms or techniques in other embodiments.

The boot image identification module 312 identifies a boot image corresponding with the identification data and associates the server 104 with the identified boot image. That is, the boot image identification module 312 determines the appropriate boot image(s) necessary to boot the hardware component(s) of the server 104 based on the identification data or identity of the server 104 and/or component(s) of the server 104. In doing so, the boot image identification module 312 may compare the identity of the hardware components (e.g., the CPUID of the server 104) to, for example, a database (e.g., the database 120) of boot images and corresponding components. For example, a first boot image may correspond with a first server 104 having a first hardware component or set of hardware components and a second boot image may correspond with a second server 104 having a second hardware component or set of hardware components different from those of the first server 104. In the illustrative embodiment, the boot image identification module 312 maps or otherwise associates the server 104 with the appropriate boot image stored on the server controller 102 (e.g., by associating the boot image with an eSPI interface of the server 104). In doing so, the boot image identification module 312 may, for example, utilize a mapping table 124 or map the server 104 directly to a memory partition of the server controller 102 storing the boot image. Of course, the boot image identification module 312 may utilize other mechanisms or techniques of associating the server 104 with the appropriate boot image(s) in other embodiments.

The server boot module 304 is configured to instruct the server 104 to boot (e.g., via the communication module 206) after the server controller 102 associates the server 104 with the appropriate boot image(s). In response to the instruction, the server 104 attempts to fetch the BIOS and/or other firmware and, by virtue of the boot module 220 (e.g., an eSPI interface), retrieves the appropriate boot image(s) from the server controller 102. It should be appreciated that the server 104 transitions from the pre-boot state (e.g., a partially powered low-power state) to a boot state (e.g., a higher-powered state) to boot. In some embodiments, the server boot module 304 may immediately instruct the server 104 to boot, whereas, in other embodiments, there may be a temporal gap between a point in time at which the server controller 102 associates the server 104 with the appropriate boot image(s) and the server boot module 304 instructs the server 104 to boot. For example, in some embodiments, multiple hardware components of the server 104 may be individually associated with the appropriate boot images. As such, the server boot module 304 may wait until all of the hardware components are associated with the appropriate boot images. As indicated above, in some embodiments, the server controller 102 may utilize a software-only approach in which the server controller 102 launches the initial BIOS boot block of the server 102 to determine the next image 122 to provide.

The communication module 306 handles the communication between the server controller 102 and the servers 104 and/or other remote devices (e.g., through a network). As described herein, the communication module 306 may transmit data to the servers 104 (e.g., boot or operating instructions, data requests, and other relevant data) and receive data from the servers 104 (e.g., identification data, boot image access requests, and other relevant data). In doing so, the communication module 306 may utilize any suitable technologies (e.g., eSPI and other technologies described herein).

Figure 4:
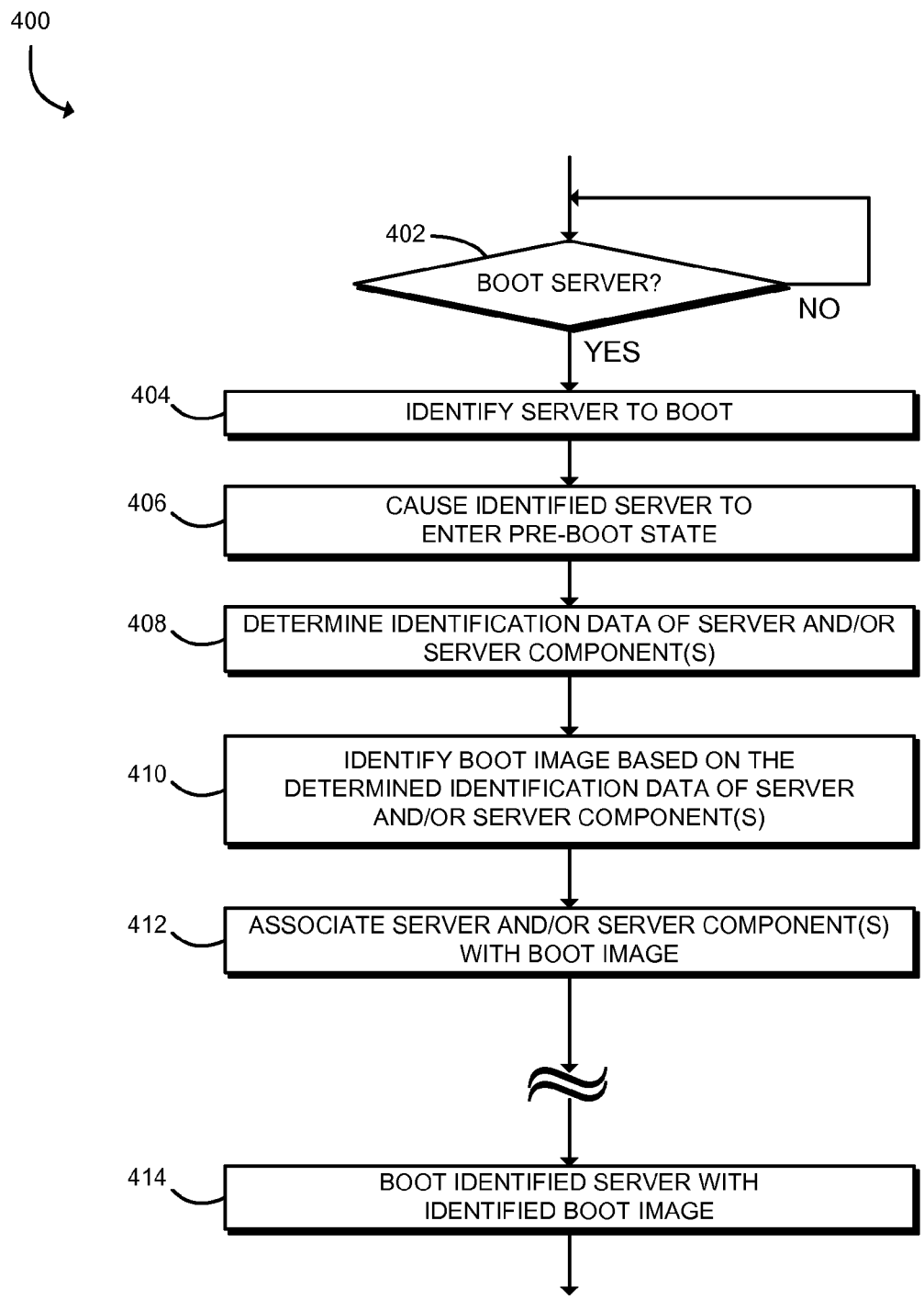
FIG. 4 is a simplified flow diagram of at least one embodiment of a method for managing boot image discovery by the server controller of the system of FIG. 1.

Referring now to FIG. 4, in use, the server controller 102 may execute a method 400 for managing image discovery by the server controller 102. The illustrative method 400 begins with block 402 in which the server controller 102 determines whether to boot a server 104. If so, the server controller 102 identifies a server 104 to boot in block 404. It should be appreciated that the server controller 102 may utilize any suitable algorithm, technique, or methodology for determining the sequence and times at which to boot, update, restore, power down, idle, and otherwise operate each of the servers 104. As such, the server controller 102 may determine to boot a particular server 104 for any number of reasons.

In block 406, the server controller 102 causes the identified server 104 to enter a pre-boot state (e.g., by causing the server 102 to be partially powered to a low-power state). For example, the server 104 may transmit power instructions to the identified server 104 to cause the server 104 to power up to the pre-boot state (e.g., by utilizing PECI, PIROM, standby power, and/or an eSPI interface of the server 104). As described above, the server 104 is powered to the pre-boot state without fetching and/or attempting to fetch BIOS and/or other firmware required to boot the server 104. For example, in some embodiments, the server 104 is unable to boot while in the pre-boot state. In the illustrative embodiment, the server controller 102 is able to communicate with the server 104 while the server 104 is in the pre-boot state. For example, in the illustrative embodiment, the server controller 102 may utilize standby power to access a PECI interface of the server 104 and thereby communicate with the server 104 without fully powering the server 104.

In block 408, the server controller 102 determines identification data of the server 104 and/or one or more components of the server 104. The server controller 102 may determine the identification data of the server 104 using any suitable techniques or mechanisms. For example, the server controller 102 may request a CPUID or other suitable identifier(s) of the server 104 and/or hardware components in some embodiments. In one embodiment, the server controller 102 determines the identification data of the server 104 by reading from the PECI or PIROM interface of the server 104. As indicated above, in some embodiments, the initial BIOS boot block may self-describe requirements to the server controller 102.

In block 410, the server controller 102 identifies an appropriate boot image(s) for the server 104 based on the determined identification data of the server 104. As indicated above, depending on the particular embodiment, the boot image may be associated with the server 104 as a whole (e.g., as a package of hardware components), with a set of hardware components, or with a particular hardware component of the server 104. For simplicity, the boot image may be described herein as being associated with the server 104 generally; however, it should be appreciated that the description of the boot image applies equally well to the circumstances in which it is associated with a set of hardware components and/or a particular hardware component and, as such, multiple boot images may be used by an identified server 104 for a single boot process.

The server controller 102 may utilize any suitable techniques, algorithms, and/or mechanisms to identify the appropriate boot image(s) based on the determined identification data. For example, in some embodiments, the server controller 102 compares the identification data of the server 104 (e.g., the CPUID) to a database that identifies one or more computing devices and/or hardware components and corresponding boot images (e.g., BIOS and/or other firmware). As such, in the illustrative embodiment, two servers 104 having the same hardware architecture may be associated with the same boot image. Depending on the particular implementation, the database may be stored locally (e.g., as a portion of the database 120) or remotely (e.g., on a computing device accessible by the server controller 102).

Figure 5:
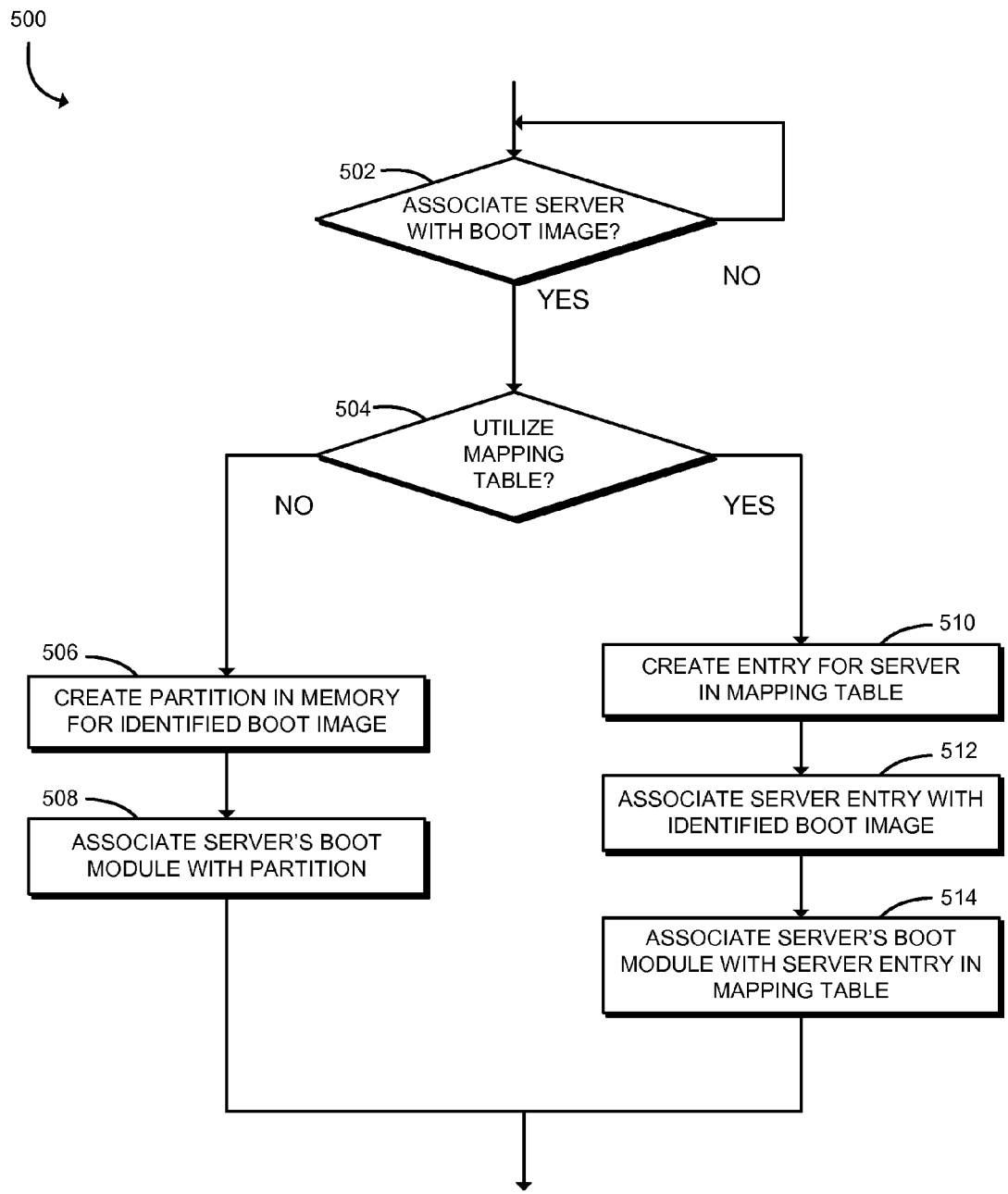
FIG. 5 is a simplified flow diagram of at least one embodiment of a method for associating a server with a boot image by the server controller of the system of FIG. 1.

In block 412, the server controller 102 associates the server 104 and/or server components with the identified boot image. To do so, the server controller 102 may execute a method 500 as shown in FIG. 5. The illustrative method 500 begins with block 502 in which the server controller 102 determines whether to associate the server 104 with the boot image. If so, the server controller 102 further determines, in block 504, whether to utilize a mapping table in associating the server 104 with the identified boot image. As discussed above, depending on the particular embodiment, the server controller 102 may establish associations/mappings between the servers 104 and the appropriate boot images by storing boot images in partitions directly mapped to the servers 104 and/or by utilizing a mapping table having entries associated with the servers 104.

If the server controller 102 determines not to utilize a mapping table, the server controller 102 creates a partition in memory of the server controller 102 (e.g., the memory 114, the data storage 116, and/or the database 120) for the identified boot image in block 506. In doing so, the server controller 102 may store the identified boot image in the created partition. It should be appreciated that the server controller 102 may create the partition and/or access the identified boot image for storage using any suitable techniques or mechanisms. For example, in some embodiments, the server controller 102 stores a copy of the boot images for each of the servers 104 associated with the server controller 102 (e.g., in the same server rack) in memory of the server controller 102 (e.g., in Dynamic Random-Access Memory (DRAM) of the server controller 102). In block 508, the server controller 102 associates the boot module 220 of the server 104 with the created partition. For example, the eSPI interface of the server 104 may be mapped to the identified boot image stored in the memory partition of the server controller 102 such that the server 104 accesses the identified boot image when booted.

Instead, if the server controller 102 determines to utilize a mapping table in block 504, the server controller 102 creates an entry for the server 104 in the mapping table in block 510. As indicated above, the mapping table may be embodied as any suitable data structure for mapping the servers 104 to the appropriate boot images. In block 512, the server controller 102 associates the server's mapping table entry with the identified boot image. For example, the server controller 102 may generate a pointer or link from the mapping table entry to a memory address of the identified boot image stored on the server controller 102 such that an access to the mapping table entry results in retrieval of the identified boot image from memory of the server controller 102. In block 514, the server controller 102 associates the boot module 220 of the server 104 with the mapping table entry. For example, the eSPI interface of the server 104 may be mapped to the server's mapping table entry such that, in response to a boot instruction, the server 104 attempts to retrieve a boot image from the mapping table entry, which, in turn, results in retrieval of the identified boot image from memory of the server controller 102.

As discussed above, in some embodiments, the server controller 102 stores a copy of the boot image for each of the servers 104 associated with the server controller 102 (e.g., in the same server rack) in memory of the server controller 102. Accordingly, in such embodiments, the server controller 102 may update the boot images for multiple servers 104 simultaneously by modifying a single boot image stored in memory of the server controller 102, because each server 104 having the same hardware architecture may have a corresponding mapping table entry associated with (e.g., pointing to) the same boot image. Of course, in some embodiments, the server controller 102 may have duplicate boot images to act as mirrors or for redundancy depending on the particular embodiment and/or number of servers 104 associated with the server controller 102. Additionally, because the boot images are stored on the server controller 102, the boot images may be updated while the servers 104 are operating (i.e., without requiring a server reset), which is not possible with traditional local flash-based BIOS systems. Further, the mechanisms and methods described herein enable an administrator to dynamically inject code to get additional profile or debug data during runtime, which is not possible with traditional systems without BIOS image updates.

Referring back to FIG. 4, the server controller 102 causes the server 104 to boot with the identified boot image in block 414. For example, the server 104 may boot in response to receiving an instruction to do so from the server controller 102. Upon commencing boot, the boot module 220 of the server 104 accesses the identified boot image from memory of the server controller 102 as described above.

EXAMPLES

Illustrative examples of the technologies disclosed herein are provided below. An embodiment of the technologies may include any one or more, and any combination of, the examples described below.

Example 1 includes a server controller for managing image discovery, the server controller comprising a pre-boot initialization module to cause a server to enter a pre-boot state; a hardware identification module to communicate with the server while the server maintains the pre-boot state to determine identification data of the server in response to a transition of the server to the pre-boot state; and a boot image identification module to (i) identify a boot image of the server based on the identification data of the server and (ii) associate the server with the identified boot image.

Example 2 includes the subject matter of Example 1, and wherein to cause the server to enter the pre-boot state comprises to cause the server to enter the pre-boot state without fetching a Basic Input/Output System (BIOS) image of the server.

Example 3 includes the subject matter of any of Examples 1 and 2, and wherein to communicate with the server comprises to communicate with the server by one of a Platform Environment Control Interface (PECI) or a Processor Information Read Only Memory (PIROM) of the server to determine the identification data of the server.

Example 4 includes the subject matter of any of Examples 1-3, and wherein to communicate with the server to determine the identification data of the server comprises to identify one or more hardware components of the server.

Example 5 includes the subject matter of any of Examples 1-4, and wherein to identify the one or more hardware components of the server comprises to determine a central processing unit identification (CPUID) of the server.

Example 6 includes the subject matter of any of Examples 1-5, and wherein to associate the server with the identified boot image comprises to store the identified boot image in a partition of a memory of the server controller; and map the server to the partition of the memory such that the stored boot image is loaded on the server in response to boot of the server.

Example 7 includes the subject matter of any of Examples 1-6, and wherein to associate the server with the identified boot image comprises to associate the boot image with an Enhanced Serial Peripheral Interface (eSPI) of the server.

Example 8 includes the subject matter of any of Examples 1-7, and wherein to associate the server with the identified boot image comprises to map the server to an entry in a database of the server controller; and associate the entry with a boot module of the server, wherein the entry of the database is associated with the identified boot image such that an access to the entry causes the identified boot image to be retrieved by the server.

Example 9 includes the subject matter of any of Examples 1-8, and wherein to associate the entry with the boot module comprises to associate the entry with an Enhanced Serial Peripheral Interface (eSPI) of the server.

Example 10 includes the subject matter of any of Examples 1-9, and further including a server boot module to instruct the server to boot in response to association of the server with the identified boot image.

Example 11 includes the subject matter of any of Examples 1-10, and wherein the server boot module is to provide the identified boot image to the server.

Example 12 includes a method for managing image discovery on a server controller, the method comprising causing, by the server controller, a server to enter a pre-boot state; communicating, by the server controller and while the server maintains the pre-boot state, with the server to determine identification data of the server in response to causing the server to enter the pre-boot state; identifying, by the server controller, a boot image of the server based on the identification data of the server; and associating, by the server controller, the server with the identified boot image.

Example 13 includes the subject matter of Example 12, and wherein causing the server to enter the pre-boot state comprises causing the server to enter the pre-boot state without fetching a Basic Input/Output System (BIOS) image of the server.

Example 14 includes the subject matter of any of Examples 12 and 13, and wherein communicating with the server comprises communicating with the server by one of a Platform Environment Control Interface (PECI) or a Processor Information Read Only Memory (PIROM) of the server to determine the identification data of the server.

Example 15 includes the subject matter of any of Examples 12-14, and wherein communicating with the server to determine the identification data of the server comprises identifying one or more hardware components of the server.

Example 16 includes the subject matter of any of Examples 12-15, and wherein identifying the one or more hardware components of the server comprises determining a central processing unit identification (CPUID) of the server.

Example 17 includes the subject matter of any of Examples 12-16, and wherein associating the server with the identified boot image comprises storing the identified boot image in a partition of a memory of the server controller; and mapping the server to the partition of the memory such that the stored boot image is loaded on the server in response to boot of the server.

Example 18 includes the subject matter of any of Examples 12-17, and wherein associating the server with the identified boot image comprises associating the boot image with an Enhanced Serial Peripheral Interface (eSPI) of the server.

Example 19 includes the subject matter of any of Examples 12-18, and wherein associating the server with the identified boot image comprises mapping the server to an entry in a database of the server controller; and associating the entry with a boot module of the server, wherein the entry of the database is associated with the identified boot image such that an access to the entry causes the identified boot image to be retrieved by the server.

Example 20 includes the subject matter of any of Examples 12-19, and wherein associating the entry with the boot module comprises associating the entry with an Enhanced Serial Peripheral Interface (eSPI) of the server.

Example 21 includes the subject matter of any of Examples 12-20, and further including instructing, by the server controller, the server to boot in response to associating the server with the identified boot image.

Example 22 includes the subject matter of any of Examples 12-21, and further including providing, by the server controller, the identified boot image to the server.

Example 23 includes a computing device comprising a processor; and a memory having stored therein a plurality of instructions that when executed by the processor cause the computing device to perform the method of any of Examples 12-22.

Example 24 includes one or more machine-readable storage media comprising a plurality of instructions stored thereon that, in response to being executed, result in a computing device performing the method of any of Examples 12-22.

Example 25 includes a computing device for managing image discovery, the computing device comprising means for causing a server to enter a pre-boot state; means for communicating, while the server maintains the pre-boot state, with the server to determine identification data of the server in response to causing the server to enter the pre-boot state; means for identifying a boot image of the server based on the identification data of the server; and means for associating the server with the identified boot image.

Example 26 includes the subject matter of Example 25, and wherein the means for causing the server to enter the pre-boot state comprises means for causing the server to enter the pre-boot state without fetching a Basic Input/Output System (BIOS) image of the server.

Example 27 includes the subject matter of any of Examples 25 and 26, and wherein the means for communicating with the server comprises means for communicating with the server by one of a Platform Environment Control Interface (PECI) or a Processor Information Read Only Memory (PIROM) of the server to determine the identification data of the server.

Example 28 includes the subject matter of any of Examples 25-27, and wherein the means for communicating with the server to determine the identification data of the server comprises means for identifying one or more hardware components of the server.

Example 29 includes the subject matter of any of Examples 25-28, and wherein the means for identifying the one or more hardware components of the server comprises means for determining a central processing unit identification (CPUID) of the server.

Example 30 includes the subject matter of any of Examples 25-29, and wherein the means for associating the server with the identified boot image comprises means for storing the identified boot image in a partition of a memory of the server controller; and means for mapping the server to the partition of the memory such that the stored boot image is loaded on the server in response to boot of the server.

Example 31 includes the subject matter of any of Examples 25-30, and wherein the means for associating the server with the identified boot image comprises means for associating the boot image with an Enhanced Serial Peripheral Interface (eSPI) of the server.

Example 32 includes the subject matter of any of Examples 25-31, and wherein the means for associating the server with the identified boot image comprises means for mapping the server to an entry in a database of the server controller; and means for associating the entry with a boot module of the server, wherein the entry of the database is associated with the identified boot image such that an access to the entry causes the identified boot image to be retrieved by the server.

Example 33 includes the subject matter of any of Examples 25-32, and wherein the means for associating the entry with the boot module comprises means for associating the entry with an Enhanced Serial Peripheral Interface (eSPI) of the server.

Example 34 includes the subject matter of any of Examples 25-33, and further including means for instructing the server to boot in response to associating the server with the identified boot image.

Example 35 includes the subject matter of any of Examples 25-34, and further including means for providing the identified boot image to the server.

Example 36 includes a server for automated image discovery, the server comprising a boot module to power the server to a pre-boot state in response to a signal received from a server controller; a communication module to (i) receive a request for identification data of the server from the server controller, (ii) transmit, while the server is in the pre-boot state, the identification data of the server to the server controller, and (iii) receive a boot instruction to boot the server in response to transmittal of the identification data, wherein the boot module is further to (i) access a boot image from a memory of the server controller in response to receipt of the boot instruction and (ii) boot the server with the boot image.

Example 37 includes the subject matter of Example 36, and wherein to power the server to the pre-boot state comprises to power the server without fetching a Basic Input/Output System (BIOS) image of the server.

Example 38 includes the subject matter of any of Examples 36 and 37, and wherein to receive the request for the identification data comprises to receive the request with one of a Platform Environment Control Interface (PECI) or a Processor Information Read Only Memory (PIROM) of the server.

Example 39 includes the subject matter of any of Examples 36-38, and wherein to access the boot image from the memory of the server controller comprises to access the boot image by an Enhanced Serial Peripheral Interface (eSPI) of the server.

Example 40 includes the subject matter of any of Examples 36-39, and wherein the pre-boot state comprises a low-power state of the server.

Example 41 includes a method for automated image discovery by a server, the method comprising powering the server to a pre-boot state in response to a signal received from a server controller; receiving, by the server, a request for identification data of the server from the server controller; transmitting, by the server and while the server is in the pre-boot state, the identification data of the server to the server controller; receiving, by the server, a boot instruction to boot the server in response to transmitting the identification data; accessing, by the server, a boot image from a memory of the server controller in response to receiving the boot instruction; and booting the server with the boot image.

Example 42 includes the subject matter of Example 41, and wherein powering the server to the pre-boot state comprises powering the server without fetching a Basic Input/Output System (BIOS) image of the server.

Example 43 includes the subject matter of any of Examples 41 and 42, and wherein receiving the request for the identification data comprises receiving the request with one of a Platform Environment Control Interface (PECI) or a Processor Information Read Only Memory (PIROM) of the server.

Example 44 includes the subject matter of any of Examples 41-43, and wherein accessing the boot image from the memory of the server controller comprises accessing the boot image by an Enhanced Serial Peripheral Interface (eSPI) of the server.

Example 45 includes the subject matter of any of Examples 41-44, and wherein powering the server to the pre-boot state comprises powering the server to a low-power state of the server.

Example 46 includes a computing device comprising a processor; and a memory having stored therein a plurality of instructions that when executed by the processor cause the computing device to perform the method of any of Examples 41-45.

Example 47 includes one or more machine-readable storage media comprising a plurality of instructions stored thereon that, in response to being executed, result in a computing device performing the method of any of Examples 41-45.

Example 48 includes a server for automated image discovery, the server comprising means for powering the server to a pre-boot state in response to a signal received from a server controller; means for receiving a request for identification data of the server from the server controller; means for transmitting, while the server is in the pre-boot state, the identification data of the server to the server controller; means for receiving a boot instruction to boot the server in response to transmitting the identification data; means for accessing a boot image from a memory of the server controller in response to receiving the boot instruction; and means for booting the server with the boot image.

Example 49 includes the subject matter of Example 48, and wherein the means for powering the server to the pre-boot state comprises means for powering the server without fetching a Basic Input/Output System (BIOS) image of the server.

Example 50 includes the subject matter of any of Examples 48 and 49, and wherein the means for receiving the request for the identification data comprises means for receiving the request with one of a Platform Environment Control Interface (PECI) or a Processor Information Read Only Memory (PIROM) of the server.

Example 51 includes the subject matter of any of Examples 48-50, and wherein the means for accessing the boot image from the memory of the server controller comprises means for accessing the boot image by an Enhanced Serial Peripheral Interface (eSPI) of the server.

Example 52 includes the subject matter of any of Examples 48-51, and wherein the means for powering the server to the pre-boot state comprises means for powering the server to a low-power state of the server.

Example 53 includes a system for managing image discovery, the system comprising a server controller; and a plurality of servers communicatively coupled to the server controller, wherein the server controller is to (i) cause a first server of the plurality of servers to enter a pre-boot state, (ii) communicate with the first server while the first server maintains the pre-boot state to determine identification data of the first server in response to a transition of the first server to the pre-boot state, (iii) identify a boot image of the first server based on the identification data of the first server, the boot image stored in a memory of the server controller, (iv) associate the first server with the identified boot image, and (v) transmit a boot instruction to the first server; and the first server is to (i) access the boot image from the memory of the server controller in response to receipt of the boot instruction and (ii) boot with the boot image.

Example 54 includes the subject matter of Example 53, and further comprising a top-of-rack switch that includes the server controller.

Example 55 includes the subject matter of any of Examples 53 and 54, and further including a server rack that includes the server controller and each of the plurality of servers.

Example 56 includes the subject matter of any of Examples 53-55, and wherein the first server comprises a first processor architecture and a second server of the plurality of servers comprises a second processor architecture different from the first processor architecture.

Example 57 includes the subject matter of any of Examples 53-56, and wherein the first server requires a first boot image to boot and a second server of the plurality of servers requires a second boot image, different from the first boot image, to boot.

Example 58 includes the subject matter of any of Examples 53-57, and wherein the server controller is to (i) cause a second server of the plurality of servers, different from the first server, to enter a pre-boot state, (ii) communicate with the second server while the second server maintains the pre-boot state to determine identification data of the second server in response to a transition of the second server to the pre-boot state, (iii) identify a boot image of the second server based on the identification data of the second server, the boot image of the second server stored in the memory of the server controller, (iv) associate the second server with the identified boot image of the second server, and (v) transmit a boot instruction to the second server; and the second server is to (i) access the identified boot image of the second server from the memory of the server controller in response to receipt of the boot instruction and (ii) boot with the identified boot image of the second server.

Example 59 includes the subject matter of any of Examples 53-58, and wherein to enter the pre-boot state, by the first server comprises to enter the pre-boot state without fetching a Basic Input/Output System (BIOS) image of the first server.

Example 60 includes the subject matter of any of Examples 53-59, and wherein to communicate with the first server comprises to communicate with the first server by one of a Platform Environment Control Interface (PECI) or a Processor Information Read Only Memory (PIROM) of the first server to determine the identification data of the first server.

Example 61 includes the subject matter of any of Examples 53-60, and wherein to communicate with the first server to determine the identification data of the first server comprises to identify one or more hardware components of the first server.

Example 62 includes the subject matter of any of Examples 53-61, and wherein to identify the one or more hardware components of the first server comprises to determine a central processing unit identification (CPUID) of the first server.

Example 63 includes the subject matter of any of Examples 53-62, and wherein to associate the first server with the identified boot image comprises to store the identified boot image in a partition of a memory of the server controller; and map the first server to the partition of the memory such that the stored boot image is loaded on the first server in response to boot of the first server.

Example 64 includes the subject matter of any of Examples 53-63, and wherein to associate the first server with the identified boot image comprises to associate the boot image with an Enhanced Serial Peripheral Interface (eSPI) of the first server.

Example 65 includes the subject matter of any of Examples 53-64, and wherein to associate the first server with the identified boot image comprises to map the first server to an entry in a database of the server controller; and associate the entry with a boot module of the first server, wherein the entry of the database is associated with the identified boot image such that an access to the entry causes the identified boot image to be retrieved by the first server.

Example 66 includes the subject matter of any of Examples 53-65, and wherein to associate the entry with the boot module comprises to associate the entry with an Enhanced Serial Peripheral Interface (eSPI) of the first server.

Example 67 includes the subject matter of any of Examples 53-66, and wherein to access the boot image from the memory of the server controller comprises to access the boot image by an Enhanced Serial Peripheral Interface (eSPI) of the first server.

Example 68 includes the subject matter of any of Examples 53-67, and wherein the pre-boot state comprises a low-power state of the first server.

Example 69 includes a method for managing image discovery, the method comprising causing, by a server controller, a first server of a plurality of servers communicatively coupled to the server controller to enter a pre-boot state; communicating, by the server controller, with the first server while the first server maintains the pre-boot state to determine identification data of the first server in response to a transition of the first server to the pre-boot state; identifying, by the server controller, a boot image of the first server based on the identification data of the first server, the boot image stored in a memory of the server controller; associating, by the server controller, the first server with the identified boot image; transmitting, by the server controller, a boot instruction to the first server; accessing, by the first server, the boot image from the memory of the server controller in response to receipt of the boot instruction; and booting the first server with the boot image.

Example 70 includes the subject matter of Example 69, and wherein a top-of-rack switch includes the server controller.

Example 71 includes the subject matter of any of Examples 69 and 70, and wherein a server rack includes the server controller and each of the plurality of servers.

Example 72 includes the subject matter of any of Examples 69-71, and wherein the first server requires a first boot image to boot and a second server of the plurality of servers requires a second boot image, different from the first boot image, to boot.

Example 73 includes the subject matter of any of Examples 69-72, and further including causing, by the server controller, a second server of the plurality of servers, different from the first server, to enter a pre-boot state; communicating, by the server controller, with the second server while the second server maintains the pre-boot state to determine identification data of the second server in response to a transition of the second server to the pre-boot state; identifying, by the server controller, a boot image of the second server based on the identification data of the second server, the boot image of the second server stored in the memory of the server controller; associating, by the server controller, the second server with the identified boot image of the second server; transmitting, by the server controller, a boot instruction to the second server; accessing, by the second server, the identified boot image of the second server from the memory of the server controller in response to receipt of the boot instruction; and booting the second server with the boot image of the second server.

Example 74 includes the subject matter of any of Examples 69-73, and wherein entering the pre-boot state, by the first server comprises entering the pre-boot state without fetching a Basic Input/Output System (BIOS) image of the first server.

Example 75 includes the subject matter of any of Examples 69-74, and wherein communicating with the first server comprises communicating with the first server by one of a Platform Environment Control Interface (PECI) or a Processor Information Read Only Memory (PIROM) of the first server to determine the identification data of the first server.

Example 76 includes the subject matter of any of Examples 69-75, and wherein communicating with the first server to determine the identification data of the first server comprises identifying one or more hardware components of the first server.

Example 77 includes the subject matter of any of Examples 69-76, and wherein identifying the one or more hardware components of the first server comprises determining a central processing unit identification (CPUID) of the first server.

Example 78 includes the subject matter of any of Examples 69-77, and wherein associating the first server with the identified boot image comprises storing the identified boot image in a partition of a memory of the server controller; and mapping the first server to the partition of the memory such that the stored boot image is loaded on the first server in response to boot of the first server.

Example 79 includes the subject matter of any of Examples 69-78, and wherein associating the first server with the identified boot image comprises associating the boot image with an Enhanced Serial Peripheral Interface (eSPI) of the first server.

Example 80 includes the subject matter of any of Examples 69-79, and wherein associating the first server with the identified boot image comprises mapping the first server to an entry in a database of the server controller; and associating the entry with a boot module of the first server, wherein the entry of the database is associated with the identified boot image such that an access to the entry causes the identified boot image to be retrieved by the first server.

Example 81 includes the subject matter of any of Examples 69-80, and wherein associating the entry with the boot module comprises associating the entry with an Enhanced Serial Peripheral Interface (eSPI) of the first server.

Example 82 includes the subject matter of any of Examples 69-81, and wherein accessing the boot image from the memory of the server controller comprises accessing the boot image by an Enhanced Serial Peripheral Interface (eSPI) of the first server.

Example 83 includes the subject matter of any of Examples 69-82, and wherein the pre-boot state comprises a low-power state of the first server.

Example 84 includes one or more machine-readable storage media comprising a plurality of instructions stored thereon that, in response to being executed, result in one or more computing devices performing the method of any of Examples 69-83.

Example 85 includes a system for managing image discovery, the system comprising means for causing, by a server controller, a first server of a plurality of servers communicatively coupled to the server controller to enter a pre-boot state; means for communicating, by the server controller, with the first server while the first server maintains the pre-boot state to determine identification data of the first server in response to a transition of the first server to the pre-boot state; means for identifying, by the server controller, a boot image of the first server based on the identification data of the first server, the boot image stored in a memory of the server controller; means for associating, by the server controller, the first server with the identified boot image; means for transmitting, by the server controller, a boot instruction to the first server; means for accessing, by the first server, the boot image from the memory of the server controller in response to receipt of the boot instruction; and means for booting the first server with the boot image.

Example 86 includes the subject matter of Example 85, and wherein a top-of-rack switch includes the server controller.

Example 87 includes the subject matter of any of Examples 85 and 86, and wherein a server rack includes the server controller and each of the plurality of servers.

Example 88 includes the subject matter of any of Examples 85-87, and wherein the first server requires a first boot image to boot and a second server of the plurality of servers requires a second boot image, different from the first boot image, to boot.

Example 89 includes the subject matter of any of Examples 85-88, and further including means for causing, by the server controller, a second server of the plurality of servers, different from the first server, to enter a pre-boot state; means for communicating, by the server controller, with the second server while the second server maintains the pre-boot state to determine identification data of the second server in response to a transition of the second server to the pre-boot state; means for identifying, by the server controller, a boot image of the second server based on the identification data of the second server, the boot image of the second server stored in the memory of the server controller; means for associating, by the server controller, the second server with the identified boot image of the second server; means for transmitting, by the server controller, a boot instruction to the second server; means for accessing, by the second server, the identified boot image of the second server from the memory of the server controller in response to receipt of the boot instruction; and means for booting the second server with the boot image of the second server.

Example 90 includes the subject matter of any of Examples 85-89, and wherein the means for entering the pre-boot state, by the first server comprises means for entering the pre-boot state without fetching a Basic Input/Output System (BIOS) image of the first server.

Example 91 includes the subject matter of any of Examples 85-90, and wherein the means for communicating with the first server comprises means for communicating with the first server by one of a Platform Environment Control Interface (PECI) or a Processor Information Read Only Memory (PIROM) of the first server to determine the identification data of the first server.

Example 92 includes the subject matter of any of Examples 85-91, and wherein the means for communicating with the first server to determine the identification data of the first server comprises means for identifying one or more hardware components of the first server.

Example 93 includes the subject matter of any of Examples 85-92, and wherein the means for identifying the one or more hardware components of the first server comprises means for determining a central processing unit identification (CPUID) of the first server.

Example 94 includes the subject matter of any of Examples 85-93, and wherein the means for associating the first server with the identified boot image comprises means for storing the identified boot image in a partition of a memory of the server controller; and means for mapping the first server to the partition of the memory such that the stored boot image is loaded on the first server in response to boot of the first server.

Example 95 includes the subject matter of any of Examples 85-94, and wherein the means for associating the first server with the identified boot image comprises means for associating the boot image with an Enhanced Serial Peripheral Interface (eSPI) of the first server.

Example 96 includes the subject matter of any of Examples 85-95, and wherein the means for associating the first server with the identified boot image comprises means for mapping the first server to an entry in a database of the server controller; and means for associating the entry with a boot module of the first server, wherein the entry of the database is associated with the identified boot image such that an access to the entry causes the identified boot image to be retrieved by the first server.

Example 97 includes the subject matter of any of Examples 85-96, and wherein the means for associating the entry with the boot module comprises means for associating the entry with an Enhanced Serial Peripheral Interface (eSPI) of the first server.

Example 98 includes the subject matter of any of Examples 85-97, and wherein the means for accessing the boot image from the memory of the server controller comprises means for accessing the boot image by an Enhanced Serial Peripheral Interface (eSPI) of the first server.

Example 99 includes the subject matter of any of Examples 85-98, and wherein the pre-boot state comprises a low-power state of the first server.

The invention claimed is:

1. A server controller for managing image discovery, the server controller comprising:
   a pre-boot initialization module to cause a remote server to enter a pre-boot state, in which the remote server is to await identification and provision, by the server controller, of a Basic Input/Output System (BIOS) to be used by the remote server;
   a hardware identification module to communicate with the remote server while the remote server maintains the pre-boot state to determine identification data of the remote server in response to a transition of the remote server to the pre-boot state; and
   a boot image identification module to identify a boot image of the remote server based on the identification data of the remote server, emulate a local flash memory of the remote server in a memory of the server controller, store the boot image in the emulated flash memory, and associate the remote server with the identified boot image, while the remote server is in the pre-boot state, wherein the boot image includes the BIOS to be used by the remote server.

2. The server controller of claim 1, wherein to cause the server to enter the pre-boot state comprises to cause the server to enter the pre-boot state without fetching a Basic Input/Output System (BIOS) image of the server.

3. The server controller of claim 1, wherein to communicate with the server comprises to communicate with the server by one of a Platform Environment Control Interface (PECI) or a Processor Information Read Only Memory (PIROM) of the server to determine the identification data of the server.

4. The server controller of claim 1, wherein to communicate with the server to determine the identification data of the server comprises to identify one or more hardware components of the server.

5. The server controller of claim 4, wherein to identify the one or more hardware components of the server comprises to determine a central processing unit identification (CPUID) of the server.

6. The server controller of claim 1, wherein to associate the server with the identified boot image comprises to:
   store the identified boot image in a partition of the memory of the server controller; and
   map the server to the partition of the memory such that the stored boot image is loaded on the server in response to boot of the server.

7. The server controller of claim 1, wherein to associate the server with the identified boot image comprises to associate the boot image with an Enhanced Serial Peripheral Interface (eSPI) of the server.

8. The server controller of claim 1, wherein to associate the server with the identified boot image comprises to:
   map the server to an entry in a database of the server controller; and
   associate the entry with a boot module of the server, wherein the entry of the database is associated with the identified boot image such that an access to the entry causes the identified boot image to be retrieved by the server.

9. The server controller of claim 8, wherein to associate the entry with the boot module comprises to associate the entry with an Enhanced Serial Peripheral Interface (eSPI) of the server.

10. The server controller of claim 1, further comprising a server boot module to instruct the server to boot in response to association of the server with the identified boot image.

11. One or more non-transitory machine-readable storage media comprising a plurality of instructions embodied thereon that, in response to execution by a computing device, cause the computing device to:
cause a remote server to enter a pre-boot state, in which the remote server is to await identification and provision, by the computing device, of a Basic Input/Output System (BIOS) to be used by the remote server;
communicate, while the remote server maintains the pre-boot state, with the remote server to determine identification data of the remote server in response to causing the remote server to enter the pre-boot state;
identify a boot image of the remote server based on the identification data of the remote server;
emulate a local flash memory of the remote server in a memory of the computing device;
store the boot image in the emulated flash memory; and
associate the remote server with the identified boot image, while the remote server is in the pre-boot state, wherein the boot image includes the BIOS to be used by the remote server.

12. The one or more non-transitory machine-readable storage media of claim 11, wherein to cause the server to enter the pre-boot state comprises to cause the server to enter the pre-boot state without fetching a Basic Input/Output System (BIOS) image of the server.

13. The one or more non-transitory machine-readable storage media of claim 11, wherein to communicate with the server comprises to communicate with the server by one of a Platform Environment Control Interface (PECI) or a Processor Information Read Only Memory (PIROM) of the server to determine the identification data of the server.

14. The one or more non-transitory machine-readable storage media of claim 11, wherein to communicate with the server to determine the identification data of the server comprises to identify one or more hardware components of the server.

15. The one or more non-transitory machine-readable storage media of claim 14, wherein to identify the one or more hardware components of the server comprises to determine a central processing unit identification (CPUID) of the server.

16. The one or more non-transitory machine-readable storage media of claim 11, wherein to associate the server with the identified boot image comprises to:
store the identified boot image in a partition of memory of the computing device; and
map the server to the partition of the memory such that the stored boot image is loaded on the server in response to boot of the server.

17. The one or more non-transitory machine-readable storage media of claim 11, wherein to associate the server with the identified boot image comprises to associate the boot image with an Enhanced Serial Peripheral Interface (eSPI) of the server.

18. The one or more non-transitory machine-readable storage media of claim 11, wherein to associate the server with the identified boot image comprises to:
map the server to an entry in a database of the computing device; and
associate the entry with a boot module of the server,
wherein the entry of the database is associated with the identified boot image such that an access to the entry causes the identified boot image to be retrieved by the server.

19. The one or more non-transitory machine-readable storage media of claim 18, wherein to associate the entry with the boot module comprises to associate the entry with an Enhanced Serial Peripheral Interface (eSPI) of the server.

20. The one or more non-transitory machine-readable storage media of claim 11, wherein to emulate a local flash memory comprises to emulate a Serial Peripheral Interface (SPI) flash memory of the server in the memory of the computing device and
wherein to associate the server with the identified boot image comprises to provide access to the boot image in the emulated SPI flash memory to the server.

21. A method for managing image discovery on a server controller, the method comprising:
causing, by the server controller, a remote server to enter a pre-boot state, in which the server is to await identification and provision, by the server controller, of a Basic Input/Output System (BIOS) to be used by the remote server;
communicating, by the server controller and while the remote server maintains the pre-boot state, with the remote server to determine identification data of the remote server in response to causing the remote server to enter the pre-boot state;
identifying, by the server controller, a boot image of the remote server based on the identification data of the remote server;
emulating, by the server controller, a local flash memory of the remote server in a memory of the server controller;
storing, by the server controller, the boot image in the emulated flash memory; and
associating, by the server controller, the remote server with the identified boot image, while the remote server is in the pre-boot state, wherein the boot image includes the BIOS to be used by the remote server.

22. The method of claim 21, wherein causing the server to enter the pre-boot state comprises causing the server to enter the pre-boot state without fetching a Basic Input/Output System (BIOS) image of the server.

23. The method of claim 21, wherein associating the server with the identified boot image comprises:
storing the identified boot image in a partition of the memory of the server controller; and
mapping the server to the partition of the memory such that the stored boot image is loaded on the server in response to boot of the server.

24. A server for automated image discovery, the server comprising:
a boot module to power the server to a pre-boot state in response to a signal received from a remote server controller, in which the server is to await identification and provision, by the remote server controller, of a Basic Input/Output System (BIOS) to be used by the server;
a communication module to (i) receive a request for identification data of the server from the remote server controller, (ii) transmit, while the server is in the pre-boot state, the identification data of the server to the remote server controller, and (iii) receive, while the server is in the pre-boot state, a boot instruction to boot the server in response to transmittal of the identification data, wherein the boot module is further to (i) access, in response to receipt of the boot instruction, a boot image from a memory of the remote server controller that emulates a local flash memory of the server and (ii) boot the server with the boot image, wherein the boot image includes the BIOS to be used by the server.

25. The server of claim 24, wherein to power the server to the pre-boot state comprises to power the server without fetching a Basic Input/Output System (BIOS) image of the server.

26. The server of claim 24, wherein to receive the request for the identification data comprises to receive the request with one of a Platform Environment Control Interface (PECI) or a Processor Information Read Only Memory (PIROM) of the server; and wherein to access the boot image from the memory of the server controller comprises to access the boot image by an Enhanced Serial Peripheral Interface (eSPI) of the server.

27. A system for managing image discovery, the system comprising:

a server controller; and a plurality of servers remote to the server controller and communicatively coupled to the server controller, wherein:

the server controller is to cause a first server of the plurality of servers to enter a pre-boot state, in which the first server is to await identification and provision, by the server controller, of a Basic Input/Output System (BIOS) to be used by the first server communicate with the first server while the first server maintains the pre-boot state to determine identification data of the first server in response to a transition of the first server to the pre-boot state, identify a boot image of the first server based on the identification data of the first server, emulate a local flash memory of the first server in a memory of the server controller, store the boot image in the emulated flash memory, associate the first server with the identified boot image, while the server is in the pre-boot state, wherein the boot image includes the BIOS to be used by the first server, and transmit a boot instruction to the first server; and the first server is to (i) access the boot image from the memory of the server controller in response to receipt of the boot instruction and (ii) boot with the boot image.

* * * * *